C. B. Allen,
Making Rivets, &c,
N° 22,843.   Patented Feb. 8, 1859.
Sheet 2-2 Sheets
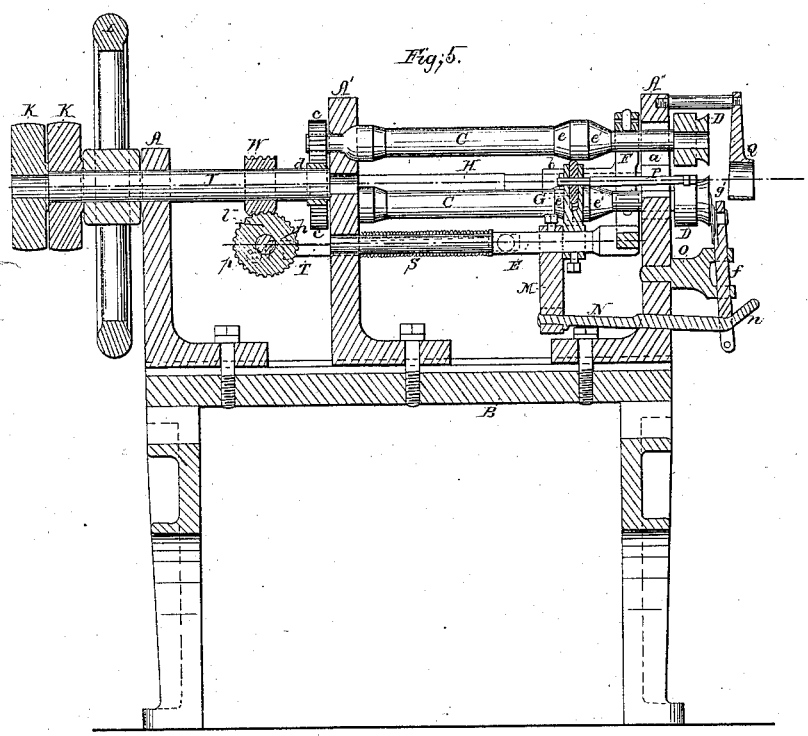
Fig; 5.
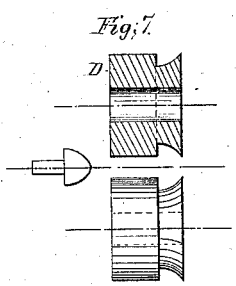
Fig; 7.
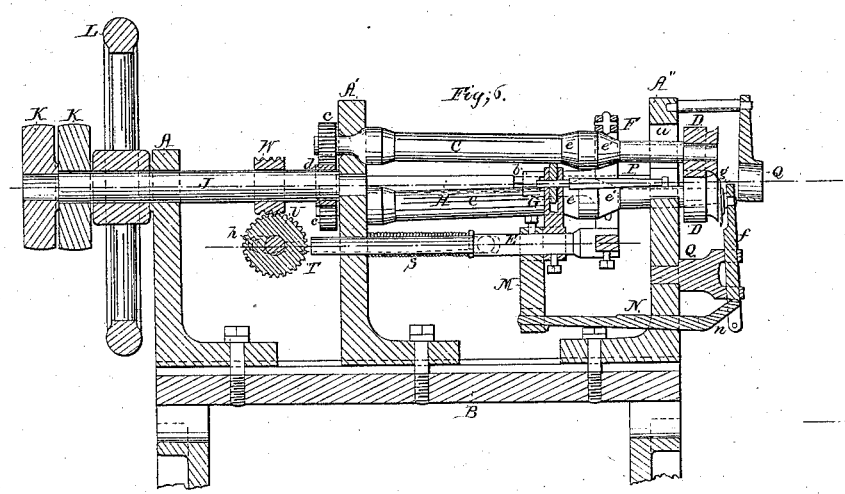
Fig; 6.
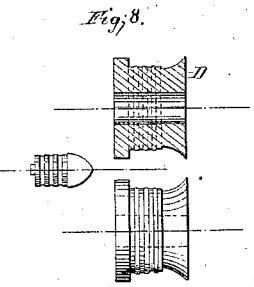
Fig; 8.
Witnesses;
Benjamin Love
Methrans Ogle
Inventor;
Charles B. Allen

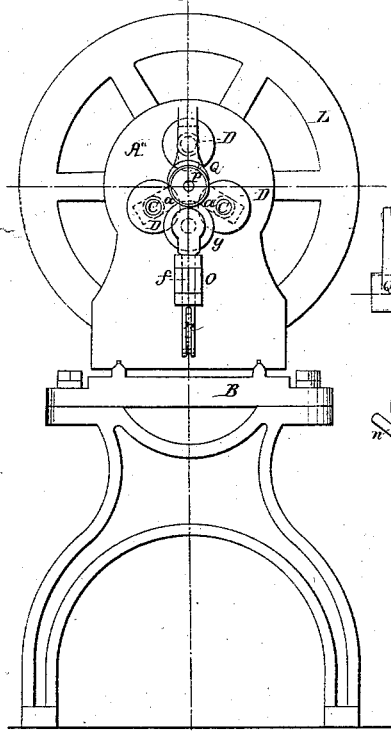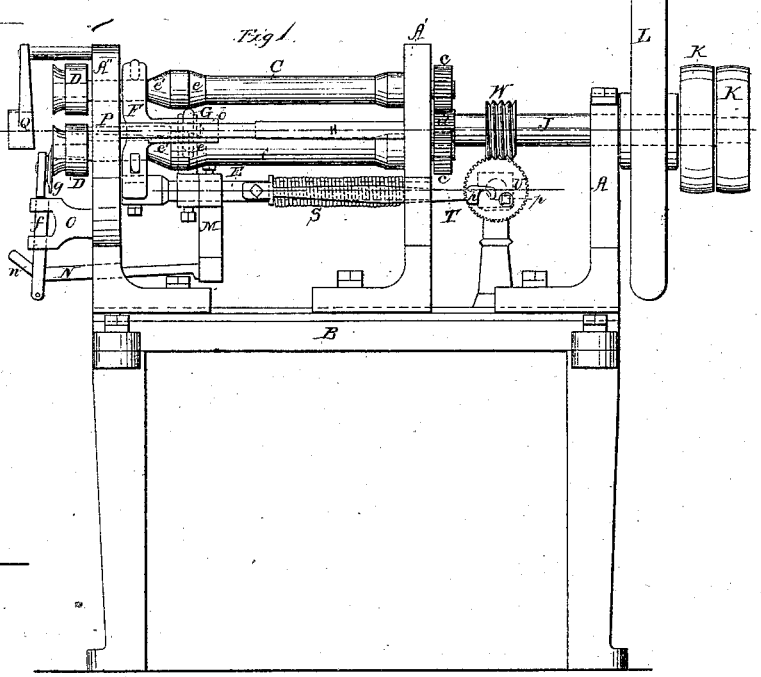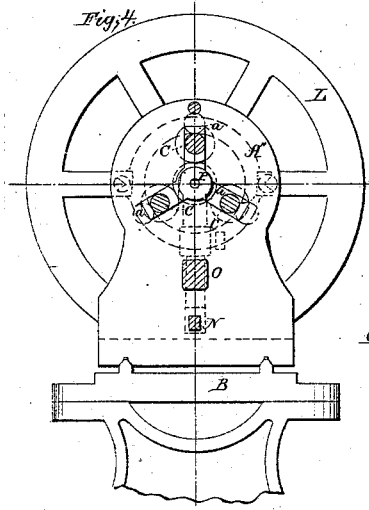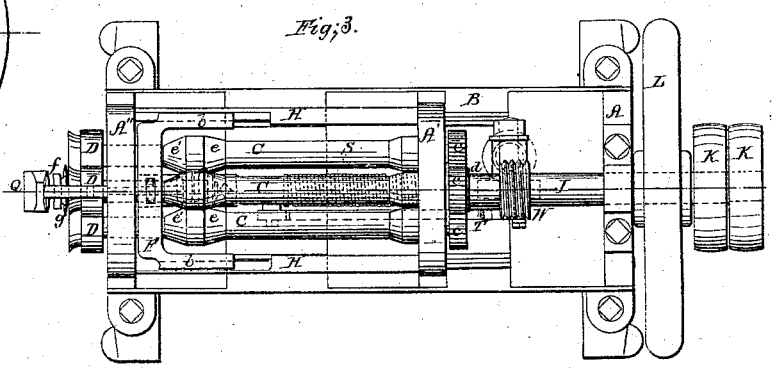

UNITED STATES PATENT OFFICE.

CHAS. B. ALLEN, OF PHILADELPHIA, PENNSYLVANIA.

MACHINE FOR MAKING RIVETS, BULLETS, &c.

Specification of Letters Patent No. 22,843, dated February 8, 1859.

*To all whom it may concern:*

Be it known that I, CHARLES B. ALLEN, of the city of Philadelphia and State of Pennsylvania, have invented a new and useful Machine Applicable in the Manufacture of Rivets, Slugs, or Bullets for Firearms, Buttons, &c.; and I do hereby declare that the following is a full, clear, and exact description of the construction and operation of the same, reference being had to the annexed drawings, making a part of this specification, of which—

Figure 1, is a side elevation of the machine. Fig. 2, is a front elevation. Fig. 3, is the ground plan. Fig. 4, is a front elevation with the mold wheels or formers removed so as to exhibit the radial slots in the head A″. Fig. 5 is a longitudinal section exhibiting the relation and arrangement of the different parts of the machine when ready for the reception of the portion of metal which is to be formed or molded. Fig. 6 is a longitudinal section exhibiting the relation and arrangement of the different parts of the machine at the moment of completion of the process of forming or molding.

The machine is composed of the following parts which are indicated by the same letters in each of the drawings. A, one of the heads of the machine somewhat similar to a lathe-head serving to support the end of the main shaft J, which carries the fly-wheel L, and the fast and loose pulleys K, K. A′, another head serving to support the other end of the mainshaft and to carry the bearings of the pinion ends of three shafts C, C, C. A″, a third head in which are cut three radial slots serving as guides in which the three shafts C, C, C, move. B, bedplate to which the three heads of the machine are attached. C, C, C, three shafts to which are attached the mold-wheels or formers D, D, D, and which receive a rotary motion through pinions c, c, c, acted upon by a spur-wheel d, placed on the main shaft J. The bearings of these three shafts at their pinion ends in the head A′, are so constructed as to permit their free movement, while the ends to which the mold wheels or formers are attached and which move in the radial slots in the head A″, are made to approach and separate. Upon each of these shafts a short distance from the head A″ is formed or turned a double inclined plane e e′, surrounding the shaft, upon which the yoke F, and the pinion wheel G, hereinafter described act. D, D, D, mold wheels or formers before named. These are attached in front of the head A″, to the extremities of the revolving shafts C, C, C, by the approximation of which they are brought to act upon the portion of metal which is to be molded or formed. The form of these wheels or formers which are so attached as to be removable at pleasure, will depend upon the particular shape into which it is desired to form the metal upon which they act. Fig. 7, of the annexed drawings represents their form when the machine is being used for the manufacture of the ordinary gasometer rivet; Fig. 8, their form when it is used for the manufacture of a rifle slug. E, a bar to which are secured the yoke F, and an arm which carries the friction-wheel G. This bar one end of which passes through a slot in the head A′ receives an alternate motion backward and forward by the operation of parts of the machine hereinafter described. F, the yoke before named. It surrounds the three shafts C, C, C, and is furnished with friction rollers at its points of contact with them so as to permit their free rotation. It is provided with cross-head jaws which rest on guides H H along which they slide or move. As this yoke is drawn backward in contact with the inclined planes e′, e′, e′, formed on the revolving shafts next the head A″, it causes the extremities of these shafts which pass through the radial slots in the head A″, and to which the mold wheels or formers are attached to approach each other. G, the friction wheel before named, the axis of which is formed by one end of the adjustable gage-rod P. This wheel when carried forward by the operation of parts of the machine hereinafter described acts upon the inclined planes e e e formed on the revolving shafts and without interrupting the free rotation of the shafts forces apart their extremities which pass through the radial slots in the head A″, so as to permit the disengagement of the portion of the metal which has been subjected to the action of the mold-wheels or formers. This wheel also serves, without interrupting their free rotation to support and steady the revolving shafts C, C, C, while they are subjected to the action of the yoke F—the wheel G receding in contact with the inclined planes $e\ e\ e$ as the yoke F, passes over the inclined planes $e'\ e'\ e'$. H H, guides before named. J, the main shaft before named. It carries at one end the spur-wheel $d$, which operates on the pinions $c, c, c$. It also carries the screw W, which gears into the worm wheel U. The worm wheel U, is provided with a crank-pin $p$, which at each revolution catches a hook $h$, at one end of the connecting-rod T, and draws the bar E, through the head A', and toward the head A, communicating to the bar and its attachments a backward motion. K, K, fast and loose pulleys before named. L, fly-wheel before named. M, arm fastened at right angles to the bar E, and having attached to its lower end the bar N, which passes through a slot in the head A''. This bar in front of the head A'' is formed into an inclined plane $n$, which as the bar N, is drawn through the head A'' with the backward movement of the bar E pushes upward the rod $f$, upon the upper end of which is placed the cutter wheel $g$. The cutter wheel $g$, and rod $f$, are used when it is necessary to sever or detach the portion of metal which has been subjected to the action of the mold-wheels or formers. O, guide in which the rod $f$, moves. P, gage-rod the adjustment of which determines the length of the portion of metal subjected to the action of the mold wheels or formers. Q, rest for supporting the rod or bar of metal upon the extremity of which the mold wheels or formers are to act. S, spring surrounding bar E. This spring communicates the forward motion to the bar E, and its attachments and carries the wheel G, along the inclined planes $e, e, e$, forcing apart the revolving shafts C, C, C. T, connecting rod before named. U, worm-wheel before named carried by a column secured to the bedplate B. W, screw before named keyed to the main-shaft J, and gearing into the worm-wheel U.

The operation of the machine is as follows: The machine is adjusted as in Fig. 5, for the reception of the metal which is to be molded or formed. If the metal is to be introduced in the form of a bar or rod as in the making of gasometer rivets or slugs, the bar or rod is supported by the rest Q, with its end in contact with the adjustable gage-rod P. The power being applied to the pulley K, causes the main shaft J, to revolve, the spur-wheel of which, $d$, acts upon the pinions $c, c, c$, and communicates a rotary motion to the three revolving shafts C, C, C.

The screw W which is keyed to the main-shaft causes the revolution of the worm-wheel U, into which it gears, the crank-pin of which $p$, catches the hook $h$, of the connecting rod T, and draws the bar E, through the head A', and toward the head A. The bar E, draws with it the yoke F, to which it is attached and which surrounds the three revolving shafts C, C, C, the friction rollers of the yoke being in contact with the inclined planes $e'\ e'\ e'$. As the friction rollers of the yoke pass over these inclined planes the ends of the revolving shafts which pass through the radial slots in the head A'', are forced to approximate bringing the mold-wheels or formers in contact with the metal which is to be subjected to their action. At the same time the wheel G, which is carried by an arm secured to the bar E, passes in contact with the inclined planes $e\ e\ e$, along which it recedes as the yoke F, encroaches on the inclined planes $e'\ e'\ e'$ serving to support and steady the three revolving shafts.

When the mold-wheels or formers have attained the greatest proximity to which the machine has been adjusted, the crank pin $p$, having passed the center of the worm-wheel U, on the side nearest the head A, the hook $h$, of the connecting rod T, becomes disengaged and the bar E, and its attachments are carried by the action of the spring S, back to their original position and the wheel G, passing again along the inclined planes $e\ e\ e$, forces the revolving shafts apart so as to permit the disengagement of the metal which has been molded or formed and the introduction of another portion for the action of the mold-wheels or formers.

If it be desirable to detach or sever from the bar or rod of metal the portion which has been subjected to the action of the mold-wheels or formers the cutter-wheel $g$, may be used which is operated as follows: The arm M, which receives its motion through the bar E, carries with it the bar N, the inclined plane of which $n$, pushes upward the rod $f$, with the cutter-wheel $g$, the parts being so adjusted that the cutter-wheel shall detach or sever the metal at the moment the action of the mold-wheels or formers is completed.

In the manufacture of slugs for fire-arms the cup or cavity in the base of the ball may be formed by giving a conical shape to the end of the gage-rod P, against which the metal is placed.

What I claim as my invention and desire to secure by Letters Patent is—

1. The revolving shafts C, C, C, with their inclined planes $e\ e'$, $e\ e'$, $e\ e'$, and formed as above described and the mold-wheels or formers D, D, D, attached thereto in combination with the yoke F, and wheel G, whereby the extremities of the shafts to which the mold-wheels or formers are attached are made to approximate and separate.

2. I also claim the bar N, and the inclined plane $n$, in combination with the rod $f$, and cutter-wheel $g$, constructed and operated substantially as above described whereby the portion of metal which has been molded or formed may when so desired be severed or detached.

CHARLES B. ALLEN.

Witnesses at signing:
BENJAMIN LOVE,
WILLIAMS OGLE.